United States Patent
Eschbach et al.

(10) Patent No.: US 8,928,949 B1
(45) Date of Patent: Jan. 6, 2015

(54) METHOD AND APPARATUS FOR MINIMIZING GRAY LEVEL VARIATION WITHIN EACH SYMBOL IN MICROTEXT

(71) Applicant: Xerox Corporation, Norwalk, CT (US)

(72) Inventors: Reiner Eschbach, Webster, NY (US); Edward Chapman, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/970,419

(22) Filed: Aug. 19, 2013

(51) Int. Cl.
- H04N 1/40 (2006.01)
- G06F 3/12 (2006.01)
- G06K 15/02 (2006.01)
- G06T 1/00 (2006.01)
- G06T 11/00 (2006.01)

(52) U.S. Cl.
CPC ............ *G06T 1/0028* (2013.01); *G06T 11/001* (2013.01)
USPC .......................... 358/3.28; 358/1.1; 358/1.11

(58) Field of Classification Search
CPC ... G06F 17/214; G06F 17/2217; G11B 20/14; B32B 2305/347; B32B 2425/00; B32B 2519/02; B42D 15/10; B42D 2033/28; H04L 1/0071; H04L 27/2647; G11C 7/1051; G11C 7/1057; G11C 7/106
USPC .......................... 358/3.28, 1.1, 1.11
See application file for complete search history.

(56) References Cited

U.S. PATENT DOCUMENTS

| | | | | |
|---|---|---|---|---|
| 4,888,812 | A * | 12/1989 | Dinan et al. | 382/140 |
| 7,980,473 | B2 * | 7/2011 | Zhang et al. | 235/462.41 |
| 8,009,893 | B2 * | 8/2011 | Rhoads et al. | 382/135 |
| 8,269,987 | B2 * | 9/2012 | Eschbach et al. | 358/1.11 |
| 8,355,167 | B2 | 1/2013 | Chapman et al. | |

* cited by examiner

*Primary Examiner* — Charlotte M Baker

(57) ABSTRACT

A method, non-transitory computer readable medium, and apparatus for minimizing gray level variation in microtext are disclosed. For example, the method calculates a gray value of each one of a plurality of symbols of a first set of symbols comprising a plurality of symbols, identifies a reference symbol of the first set of symbols, determines a reference gray value of the reference symbol and adjusts the gray value of one or more of the plurality of symbols of the first set of symbols to be equivalent to the reference gray value.

20 Claims, 4 Drawing Sheets

METHOD AND APPARATUS FOR MINIMIZING GRAY LEVEL VARIATION WITHIN EACH SYMBOL IN MICROTEXT

The present disclosure relates generally to generating microtext and, more particularly, to a method and an apparatus for minimizing gray level variation within each symbol in microtext.

BACKGROUND

In security applications, it is desirable to add information into a document that prevents and hinders alterations and counterfeiting. There is always a conflict between security requirements and design intention for the security documents. The security element has to be robust against attacks, while at the same time not being obtrusive or "ugly". In the best of both worlds, the security element can become an active part of the document design.

Microtext is one form of a security feature that can be used. For example, U.S. Pat. No. 8,355,167 describes a method of writing graphic elements in microtext or other security elements. However, with microtext there is virtually no design freedom left and the look and feel of the element becomes rather distracting from the document content.

SUMMARY

According to aspects illustrated herein, there are provided a method, a non-transitory computer readable medium, and an apparatus for minimizing gray level variation in microtext. One disclosed feature of the embodiments is a method that calculates a gray value of each one of a plurality of symbols of a first set of symbols comprising a plurality of symbols, identifies a reference symbol of the first set of symbols, determines a reference gray value of the reference symbol and adjusts the gray value of one or more of the plurality of symbols of the first set of symbols to be equivalent to the reference gray value.

Another disclosed feature of the embodiments is a non-transitory computer-readable medium having stored thereon a plurality of instructions, the plurality of instructions including instructions which, when executed by a processor, cause the processor to perform operations that calculates a gray value of each one of a plurality of symbols of a first set of symbols comprising a plurality of symbols, identifies a reference symbol of the first set of symbols, determines a reference gray value of the reference symbol and adjusts the gray value of one or more of the plurality of symbols of the first set of symbols to be equivalent to the reference gray value.

Another disclosed feature of the embodiments is an apparatus comprising a processor and a computer readable medium storing a plurality of instructions which, when executed by the processor, cause the processor to perform an operation that calculates a gray value of each one of a plurality of symbols of a first set of symbols comprising a plurality of symbols, identifies a reference symbol of the first set of symbols, determines a reference gray value of the reference symbol and adjusts the gray value of one or more of the plurality of symbols of the first set of symbols to be equivalent to the reference gray value.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for minimizing gray level variation in microtext. As discussed above, microtext is one form of security that is used for documents. Microtext typically consists of a set of symbols combined in a font, where each symbol is a readable, or otherwise, meaningful representation. In one embodiment, the term symbol or character may be used interchangeably to cover machine readable as well as human readable forms. If two fonts exist one can conceptually alternate between the two fonts in a deterministic manner to produce simple images such as borders. However, one of the drawbacks to microtext is the inability to use it in any form of graphics design or graphical images, the reason for which will be outlined below.

One embodiment of the present disclosure provides a method to minimize gray level variation between each symbol used for microtext to provide a more balanced image and between two font sets derived from the corresponding symbols. As a result, the balanced image provides a higher quality image when compared to an unbalanced image that does not adjust for gray level variation between each symbol within a relevant set of symbols.

Another disclosed feature of the embodiment is the interchange of symbols from the primary set and the secondary set of adjusted symbols as a function of auxiliary input data. Thereby, creating a visually discernible design pattern, while maintaining the integrity of a symbol's meaning.

Figure 1:
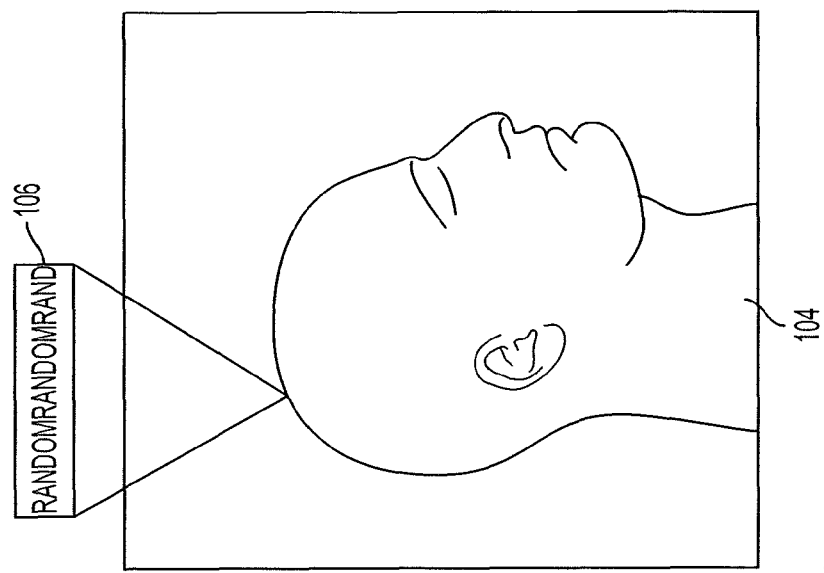
FIG. 1 illustrates example microtext images.
Figure 1:
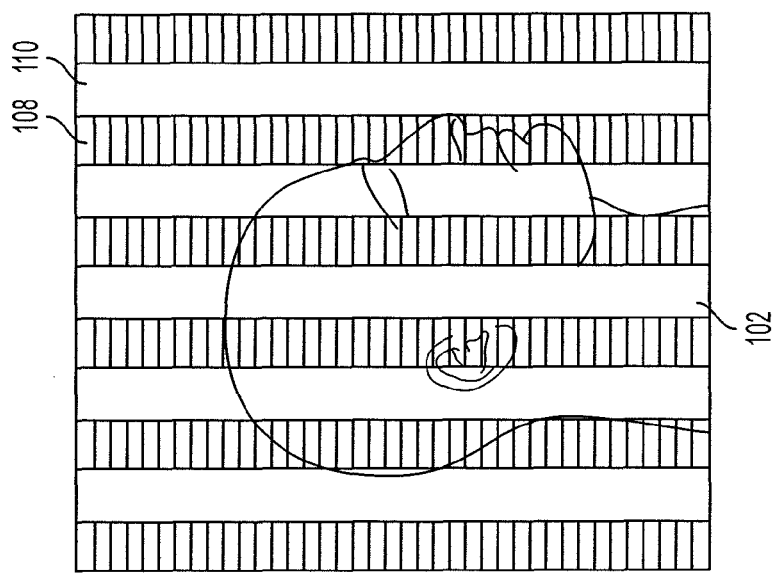

FIG. 1 illustrates a side-by-side comparison of an unbalanced image 102 versus a balanced image 104. Notably, the unbalanced image 102 does not adjust for any gray level variation between each symbol in the microtext. As a result, the unbalanced imaged 102 displays distinct dark columns 108 and light columns 110 throughout the image.

In contrast, the balanced image 104 utilizes the disclosed method for adjusting a gray level variation between each symbol of a relevant set of symbols (hereinafter also referred to broadly as a first set of symbols) in the microtext. As a result, a more detailed and smoother image is produced.

A detailed examination of any portion of the balanced image 104 will reveal the use of microtext as illustrated in box 106. For example, the entire balanced image 104 may be rendered using microtext "RANDOM," or any other set of symbols. As will be discussed in further detail below, the entire balanced image 104 may be rendered by deterministically selecting between symbols of a first relevant set of symbols (hereinafter also referred to broadly as a first set of symbols) and a second relevant set of symbols (hereinafter also referred to broadly as a second set of symbols).

In one embodiment, to minimize gray level variation between each symbol in a relevant set of symbols, a gray level of each symbol is adjusted to be equivalent to a reference symbol of the relevant set of symbols. The relevant symbols may vary depending on a particular application. For example, for general applications ASCII alphanumeric characters and punctuation marks or various alphanumeric character fonts may be used. In another embodiment that uses telephone numbers, only number characters may be used. In one embodiment, some symbols may be omitted from the gray level minimization processing such as "periods" or "commas".

In one embodiment, the reference symbol may be the "darkest" symbol. For example, the "darkest" symbol may be the symbol in the relevant set of symbols having a highest gray value. The "darkest" symbol may be identified as the reference symbol and the corresponding gray value may be referred to as the reference gray value. As a result, all other symbols within the relevant set of symbols may be adjusted to increase a gray value to be equivalent to the reference gray value of the reference symbol.

In another embodiment, not all of the symbols may need to be adjusted. For example, in some applications some symbols may not be adjusted due to a very infrequent use of the symbol that leads to an acceptably low error rate. For example, using ASCII characters, the letter "x" may be so infrequently used that a gray value of the letter "x" need not be adjusted to be equivalent to the highest gray level of the reference symbol.

In one embodiment, the reference symbol may be arbitrarily chosen. For example, the reference symbol may not be the "darkest" symbol. However, the remaining symbols may be adjusted to either be darker or lighter to have a gray level that is equivalent to the reference symbol.

In one embodiment, adjusting the gray value to be darker may include adding dark pixels within a font of a symbol to increase the gray value. In one embodiment, adjusting the gray value to be lighter may include adding white pixels within a font of a symbol to decrease the gray value.

Figure 2:
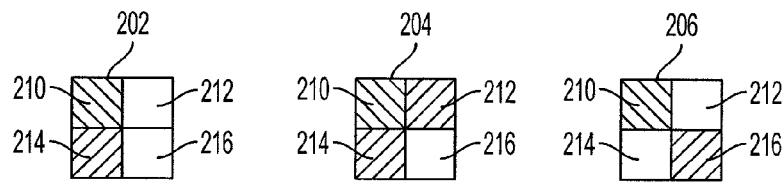
FIG. 2 illustrates an example calculation for adjusting a gray level.

FIG. 2 illustrates one example calculation for calculating gray values, identifying a reference symbol and adjusting the gray value to be equivalent to the highest gray value of the reference symbol. For ease of discussion, FIG. 2 illustrates a single set of relevant symbols that contains three symbols. Each symbol may include four pixels of having a maximum value of 255 to represent white for an eight bit per pixel application. However, it should be noted that the calculation may equally apply to a second set of relevant symbols of any size pixels and maximum value for white (e.g., 255 for 8 bits per pixel, 65,535 for 16 bits per pixel, and the like). In addition, the relevant set of symbols may include any number of symbols having any number of pixels and any maximum value for white.

In one embodiment, the symbols may consist of an ASCII character set and the size of the individual symbols may be in a range of 3×5 pixels to 9×9 pixels. In another embodiment, the size of the individual symbols may be 6×7 pixels and the largest pixels may be 9×9 pixels. However, the example types of relevant symbols and sizes described above should not be considered limiting. For example, another type of relevant symbols that can be used is a Cyrillic Character/Symbol set. Also, the size of the individual symbols may be as large as 12×12 pixels, and the like.

In one embodiment, three symbols 202, 204 and 206 may be processed each having four pixels 210, 212, 214 and 216. In one embodiment, the symbol 202 may have light pixels 210 and 214, the symbol 204 may have light pixels 210, 212 and 214 and the symbol 206 may have light pixels 210 and 216. In one embodiment, the average gray value of each symbol may be calculated as the number of light pixels times a maximum value for white divided by the total number of pixels as show in Equation 1 below.

$$\text{Avg. gray value} = (\text{\# of light pixels} \times \text{a maximum value for white})/\text{\# of pixels.} \quad \text{Equation (1):}$$

Thus, the average gray value for the symbol 202 would be (2×255)/4=127.5, for the symbol 204 would be (3×255)/4=191.25 and for the symbol 206 would be (2×255)/4=127.5. Thus, the highest gray value (a value closest to zero) could be either the symbol 202 or 206. In one embodiment, to minimize the gray level variation the symbol 204 may be adjusted to darken the symbol to have a gray value that is equivalent to the symbol 202 or 206 that may be considered as a reference symbol. For example, the symbol 204 may be adjusted by a correction term "c". In one embodiment, the adjustment that is required may be represented by the Equation 2 below.

$$\text{Adjustment} = (\text{number of light pixels} * (\text{a maximum value of white} - \text{a correction factor}))/\text{\# of pixels} = (\text{number of light pixels of reference symbol} * \text{a maximum value of white})/\text{\# of pixels} \quad \text{Equation (2):}$$

Thus, using Equation (2) above, the adjustment may be calculated as illustrated in FIG. 2. In the example illustrated in FIG. 2, the correction term would be equal to ⅓ of 255 or approximately 85. As a result, the symbol 204 may be adjusted by increasing the gray value by approximately a value of 85 (e.g., reducing the gray value closer to zero by the correction factor value of approximately 85). In one embodiment, the increase may be implemented by darkening one or more additional pixels. Conversely, if the symbol 204 needed to be adjusted by decreasing the gray value, the decrease could be implemented by whitening one or more additional pixels.

In one embodiment, all of the symbols in a relevant set of symbols may be adjusted in accordance with the example illustrated in FIG. 2. In another embodiment, less than all of the symbols in a relevant set of symbols may be adjusted in accordance with the example illustrated in FIG. 2. For example, some symbols in a relevant set (e.g., the letter "x" if the relevant set contains alphanumeric characters) may not need to be adjusted due to a very low frequency of use. As a result, the error rate is acceptably low even if the symbol is not adjusted.

In one embodiment, the reference symbol may not be the "darkest" symbol of the relevant set of symbols. For example, the reference symbol may have an average gray value of the entire relevant set of symbols and the remaining symbols may be adjusted (e.g., either darkened or lightened) to have a gray value that is equivalent to the gray value of the reference symbol.

In one embodiment, the reference symbol may have its gray value adjusted before being selected. For example, the reference symbol having a highest gray value may have natural gray value of 125, but it may be adjusted to be 170 to be lighter for a particular application. Accordingly, the remaining symbols may be adjusted to be equivalent to the adjusted gray value of the reference symbol.

In one embodiment, the gray values for each one of two or more fonts can be adjusted in accordance with the calculations described in FIG. 2. As discussed above, two or more fonts can be conceptually alternated in a deterministic manner to produce an image, such as image 104 in FIG. 1 that is more balanced than microtext methods that were previously used.

For example, a first font including a set of relevant symbols may be derived and a second font including the same set of relevant symbols, but being either darker or lighter, may be derived. The first font and the second font may be synchronized so that one string can be rendered. For example, if alphanumeric characters were used as the set of relevant symbols, the first font and the second font would each include a letter "a", a letter "b", a letter "c," and so forth. As a result, in one embodiment, the first font and the second font can be interchanged based on another data stream. The first font and the second font may each be balanced individually using the calculation described above with reference to FIG. 2 to adjust the gray values of each symbol of the first font and each symbol of the second font.

Then a string, for example "HELLO WORLD," may be rendered by deterministically picking from either the first font or the second font. The string "HELLO WORLD" that has been deterministically rendered may then be used to generate the image. In other words, the visual impression or image may be governed by the deterministic input, whereas detailed examination of the visual impression would reveal the string "HELLO WORLD" string. In one embodiment, the determinism may be a standard halftone procedure. In one embodiment, the halftone procedure may be a dispersed method such as Bayer, Error Diffusion, pulse density modulation, and the like. Thus, the gray values of each font may be balanced and then the used in a deterministically to produce a balanced image in microtext.

Figure 3:
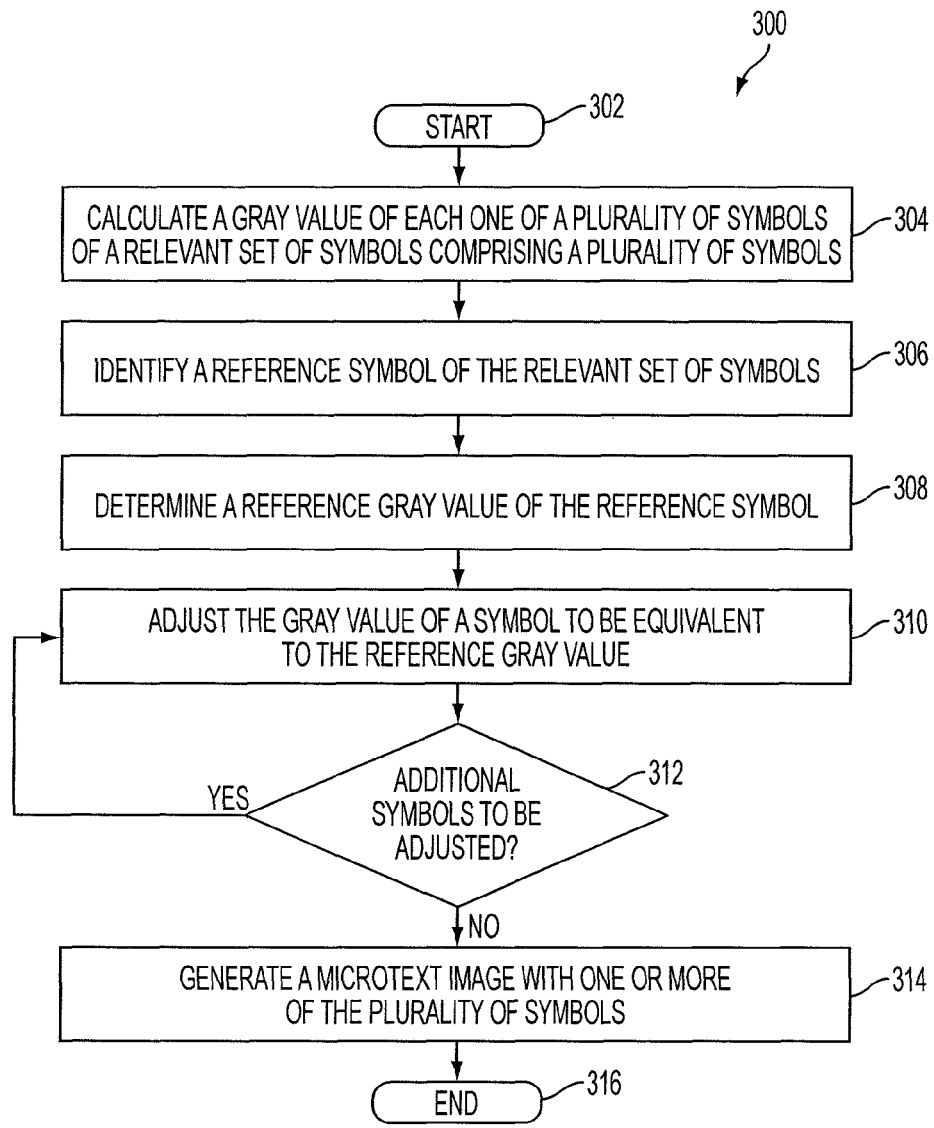
FIG. 3 illustrates an example flowchart of a method for minimizing gray level variation in microtext.
Figure 4:
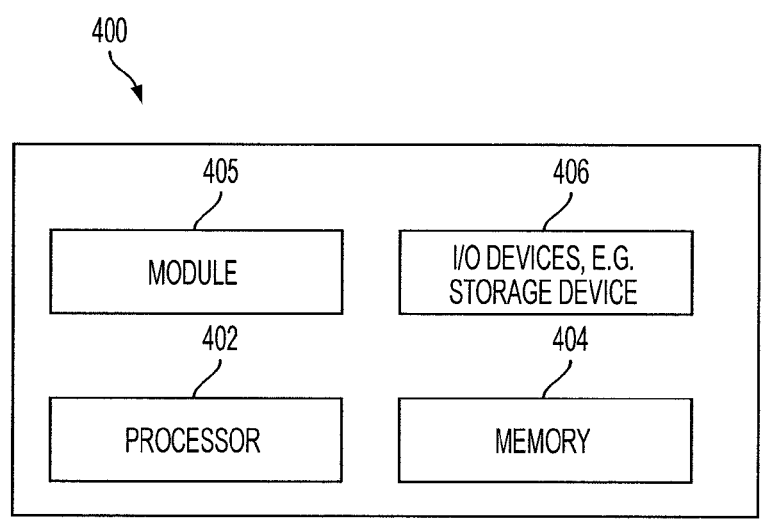
FIG. 4 illustrates a high-level block diagram of a general-purpose computer suitable for use in performing the functions described herein.

FIG. 3 illustrates a flowchart of a method 300 for minimizing gray level variation in microtext. In one embodiment, one or more steps or operations of the method 300 may be performed by a multi-function printing device or a general-purpose computer as illustrated in FIG. 4 and discussed below.

The method 300 begins at step 302. At step 304, the method 300 calculates a gray value of each one of a plurality of symbols of a relevant set of symbols comprising a plurality of symbols. One example, of how to calculate a gray value for a symbol is illustrated in FIG. 2 and described above.

At step 306, the method 300 identifies a reference symbol of the relevant set of symbols. In one embodiment, the reference symbol may be a symbol having a highest gray value compared to a gray value of the other symbols in the relevant set. In other words, the reference symbol may be the "darkest" symbol. In another embodiment, the reference symbol may not necessarily be the "darkest" symbol, as discussed above.

At step 308, the method 300 determines a reference gray value of the reference symbol. For example, the method 300 may simply obtain the gray value of the reference symbol that was calculated in step 304.

At step 310, the method 300 may adjust the gray value of a symbol to be equivalent to the reference gray value. For example, a correction factor may be applied to the gray value of the one or more of the remaining symbols in the relevant set of symbols. The correction factor may be a function of a difference of the gray value of a symbol from the reference gray value of the reference symbol. One example of the calculation is described above with reference to FIG. 2.

In one embodiment, adjusting may include either darkening the symbol to have a gray value that is equivalent to the reference symbol or lightening the symbol to have a gray value that is equivalent to the reference symbol. Equivalent may be defined as being approximately equal to. For example, the adjustment should be close enough that a difference in the gray values is not visibly noticeable. In one embodiment, the adjusting may include adjusting the symbol to have a gray value that is equal to the reference gray value.

At step 312, the method 300 determines if additional symbols need to be adjusted. In one embodiment, all of the symbols in a relevant set of symbols may be adjusted. In another embodiment, less than all of the symbols in a relevant set of symbols may be adjusted.

In one embodiment, the additional symbols may be for a second relevant set of symbols. As discussed above, to generate a microtext image, typically two or more sets of relevant symbol or fonts are used and deterministically selected.

If an additional symbol needs to be adjusted at step 312, the method 300 may return to step 310 to adjust a gray value of the additional symbol. If an additional symbol does not need to be adjusted at step 312, the method 300 may proceed to step 314.

At step 314, the method 300 generates a microtext image with one or more of the plurality of symbols. For example, the microtext image may be a graphical image. For example, the graphical image may be a picture or portrait made up of the relevant set of symbols. In other words, the microtext image may be more complicated than a simple border on a document or a single line.

In one embodiment, microtext image generated in step 314 may be created by symbols selected deterministically from multiple sets of relevant symbols. For example, a first relevant set of symbols and a second relevant set of symbols may use the same set of symbols in each set, but the symbols in the first relevant set may be darker than the corresponding symbol in the second relevant set. Also, the first relevant set of symbols may have a first reference symbol and a first reference gray level that the remaining symbols of the first relevant set of symbols are adjusted to. Correspondingly, the second relevant set of symbols may have a second reference symbol and a second reference gray level that the remaining symbols of the second relevant set of symbols are adjusted to. Accordingly, the method 300 may be applied to both relevant sets of symbols. For example, the steps 304, 306, 308, 310 and 312 may be repeated for the first relevant set of symbols and the second relevant set of symbols if multiple relevant set of symbols are used for the microtext. At step 316, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for minimizing gray level variation in microtext, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for minimizing gray level variation in microtext can be loaded into memory 404 and executed by processor 402 to implement the functions as discussed above. As such, the present method 405 for minimizing gray level variation in microtext (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for minimizing gray level variation in microtext, comprising:
    calculating, by a processor, a gray value of each one of a plurality of symbols of a first set of symbols comprising a plurality of symbols;
    identifying, by the processor, a reference symbol of the first set of symbols;
    determining, by the processor, a reference gray value of the reference symbol; and
    adjusting, by the processor, the gray value of one or more of the plurality of symbols of the first set of symbols to be equivalent to the reference gray value.

2. The method of claim 1, further comprising:
    repeating the identifying, the determining and the adjusting for a second set of symbols; and
    generating a microtext image with one or more of the plurality of symbols of the first set of symbols and one or more of a plurality of symbols of the second set of symbols that are selected using a deterministic method.

3. The method of claim 1, wherein the reference symbol comprises a symbol of the plurality of symbols having a highest gray value.

4. The method of claim 1, wherein the reference symbol comprises a symbol of the plurality of symbols that does not have the highest gray value.

5. The method of claim 1, wherein adjusting comprises increasing the gray value to be equivalent to the reference gray value or decreasing the gray value to be equivalent to the reference gray value.

6. The method of claim 1, wherein adjusting comprises;
    calculating a respective correction value for a respective gray value of the one or more of the plurality of symbols; and
    applying the respective correction value to the respective gray value of the one or more of the plurality of symbols.

7. The method of claim 1, wherein the gray value of the one or more of the plurality of symbols of the first set of symbols is adjusted to be equal to the reference gray value.

8. The method of claim 1, wherein the gray value of each one of the plurality of symbols of the first set of symbols is adjusted.

9. The method of claim 1, wherein the calculating, the identifying, the determining and the adjusting are performed for a second reference symbol of a second set of symbols comprising the plurality of symbols, wherein the second reference symbol has a second reference gray value, wherein the reference gray value and the second reference gray value are different.

10. A non-transitory computer-readable medium storing a plurality of instructions which, when executed by a processor, cause the processor to perform operations for minimizing gray level variation in microtext, the operations comprising:
    calculating a gray value of each one of a plurality of symbols of a first set of symbols comprising a plurality of symbols;
    identifying a reference symbol of the first set of symbols;
    determining a reference gray value of the reference symbol; and
    adjusting the gray value of one or more of the plurality of symbols of the first set of symbols to be equivalent to the reference gray value.

11. The non-transitory computer-readable medium of claim 10, further comprising:
    repeating the identifying, the determining and the adjusting for a second set of symbols; and
    generating a microtext image with one or more of the plurality of symbols of the first set of symbols and one or more of a plurality of symbols of the second set of symbols that are selected using a deterministic method.

12. The non-transitory computer-readable medium of claim 10, wherein the reference symbol comprises a symbol of the plurality of symbols having a highest gray value.

13. The non-transitory computer-readable medium of claim 10, wherein the reference symbol comprises a symbol of the plurality of symbols that does not have the highest gray value.

14. The non-transitory computer-readable medium of claim 10, wherein adjusting comprises increasing the gray value to be equivalent to the reference gray value or decreasing the gray value to be equivalent to the reference gray value.

15. The non-transitory computer-readable medium of claim 10, wherein adjusting comprises;
    calculating a respective correction value for a respective gray value of the one or more of the plurality of symbols; and
    applying the respective correction value to the respective gray value of the one or more of the plurality of symbols.

16. The non-transitory computer-readable medium of claim 10, wherein the gray value of the one or more of the plurality of symbols of the first set of symbols is adjusted to be equal to the reference gray value.

17. The non-transitory computer-readable medium of claim 10, wherein the gray value of each one of the plurality of symbols of the first set of symbols is adjusted.

18. The non-transitory computer-readable medium of claim 10, wherein the calculating, the identifying, the determining and the adjusting are performed for a second reference symbol of a second set of symbols comprising the plurality of symbols, wherein the second reference symbol has a second reference gray value, wherein the reference gray value and the second reference gray value are different.

19. A method for minimizing gray level variation in microtext, comprising:
    calculating, by a processor, a gray value of each one of a plurality of symbols of a first set of symbols and each one of the plurality of symbols of a second set of symbols;
    identifying, by the processor, a first reference symbol of the first set of symbols, wherein the first reference symbol comprises a symbol having a highest gray value from the first set of symbols;

identifying, by the processor, a second reference symbol of the second set of symbols, wherein the second reference symbol comprises a symbol having a highest gray value from the second set of symbols;

increasing, by the processor, the gray value of each one of the plurality of symbols of the first set of symbols to be equivalent to the highest gray value of the first reference symbol;

increasing, by the processor, the gray value of each one of the plurality of symbols of the second set of symbols to be equivalent to the highest gray value of the second reference symbol; and generating, by the processor, a microtext image with one or more of the plurality of symbols of the first set of symbols and with one or more of the plurality of symbols of the second set of symbols that each have the gray value increased.

20. The method of claim 19, wherein the first set of symbols and the second set of symbols comprise alphanumeric character fonts.

* * * * *